Oct. 15, 1957  H. E. RINGGOLD  2,809,439
CENTERING TOOL
Filed June 17, 1954
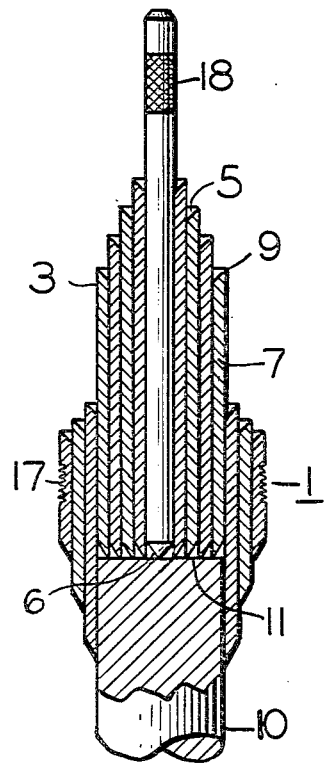
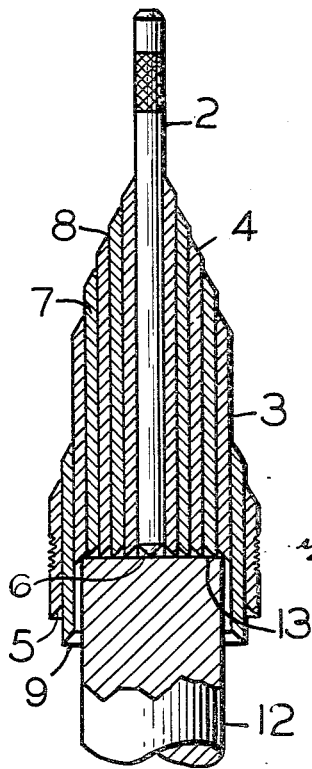
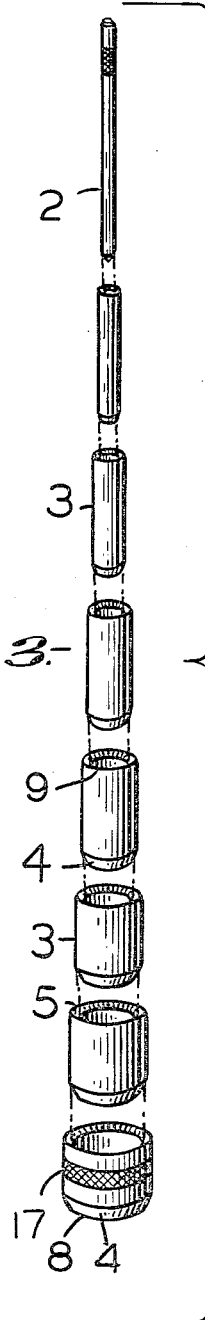
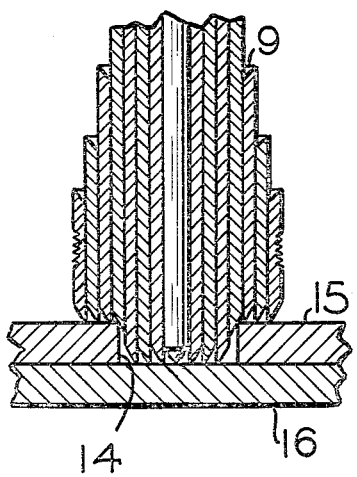
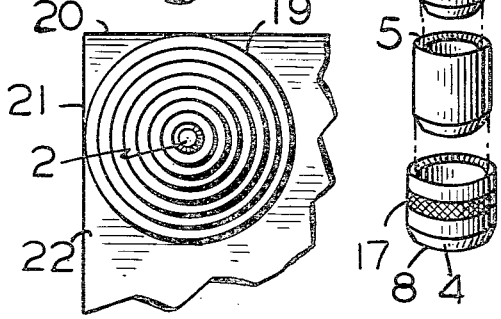
INVENTOR.
HOMER E. RINGGOLD
BY
*Joseph H. Denny*
HIS ATTORNEY

United States Patent Office 2,809,439
Patented Oct. 15, 1957

2,809,439

CENTERING TOOL

Homer E. Ringgold, Milford, Del.

Application June 17, 1954, Serial No. 437,487

4 Claims. (Cl. 33—191)

My invention is concerned with improvement in centering tools and in particular with that type used for locating the center of shafts and in translating the center of a hole in a templet to a work piece.

Generally, a centering tool is useful only for centering a given sized hole or useful only in centering a shaft of a specific diameter. Little attention has been given to the problem of producing a centering tool which will also provide means to hold the tool at right angles to the shaft being centered or hole being translated. Furthermore, most hand centering tools require a templet with a substantial depth in order to accurately position the centering tool therein.

I have developed a centering tool which can be used in connection with a large range of sizes and which can be used with relatively thin templets. My centering tool will automatically align itself with the axis of the shaft and will also automatically locate itself with the axis of the tool perpendicular to the plane of the work piece and templet.

My centering tool consists of a plurality of telescoping, bevel-ended cylinders encompassing a center punch. The beveled ends of the cylinders in combination with the point of the centering tool forms a cone. The cylinder shells are of a thickness to provide increments of convenient sizes so as to readily fit standard sized shafts and bores.

The bevelled ends of each cylinder are cut or ground perpendicularly to the axis of the cylinder. Thus, any cylinder larger than a given bore will form a perpendicular with the templet and any cylinder smaller than the bore will pass through the bore and form a perpendicular with the work piece. Regardless of the size of the bore, therefore, if it is within the limits of the tool, the centering tool will always be perpendicular to the work piece and templet and the centering punch will accurately translate the center of the bore.

When the tool is used in locating the center of a shaft the cylindrical shells of a diameter smaller than that of the shaft will align themselves in a perpendicular with the end of the shaft and the over sized cylindrical shells will slip over the shaft and form a firm engagement therewith, if the shaft is of standard size. If the shaft is not of standard size then the bevelled surface of the cylindrical shell having a diameter comparable to that of the shaft engages the peripheral edge of the shaft and the over-sized cylindrical shells may be removed. The undersized cylindrical shells, as heretofore, will form a perpendicular with the end of the shaft so as to accurately center the tool thereon.

My centering tool may also be used in locating the center of a hole to be drilled at the corner of a plate merely by lining up the outside surface of the cylinder of proper diameter with the square edges of the work piece.

The primary object of my invention is to provide a centering tool which is accurate for machine tool work and which can be used in a large variety of sizes.

A further object of my invention is to provide a centering tool which may be readily diminished or increased in size by removing the cylindrical shells therefrom in order to accommodate the working limitations of the piece to be centered.

A further object of my invention is to provide a centering tool which is accurately machined and which can be readily used as a hole gauge in addition to performing its normal function of a centering tool.

A still further object of my invention is to provide a centering tool which can be readily carried in the hand but which provides an accuracy over a large range of sizes which is compatible with the tolerances demanded in machine tool work.

The principles and characteristic features of my invention, and the manner of making and using my improved centering tool will further appear in the accompanying drawings and the following description explaining the best mode in which I have contemplated applying such principles.

In the drawings—

Fig. 1 is a cross-sectional view of my centering tool located on a standard sized shaft;

Fig. 2 is a cross sectional view of my centering tool, in reverse position as contrasted with Fig. 1, located on an odd sized shaft;

Fig. 3 is an exploded view of my centering tool;

Fig. 4 is a cross-sectional view of my centering tool located in a bore of a templet; and Fig. 5 is a top plan view of my centering tool located in the corner of a work piece.

The centering tool 1 comprises a center rod punch 2 axially slideable within a series of telescoping cylindrical shells 3 having bevelled surfaces 4 and 5 at the opposite ends of the shells 3. All of the bevelled surfaces 4 and 5 are cut in the same direction and at the same angle with reference to the axis of the centering tool. As may be seen in Fig. 2, the bevelled surfaces 4 are complementary and form with the point 6 of the punch 2 a solid cone when placed in matching relationship. The perimetrical edges 8, formed by the intersection of the bevelled surfaces 4 with the interior diameters of the shells 3, and the perimetrical edges 9 formed by the intersection of the bevelled surfaces 5 with the exterior diameters of the shells 3, are cut or formed so that they are at right angles to the longitudinal axis of the centering tool 1 and the punch 2.

The walls 7 of the cylindrical shells 3 are preferably of uniform thickness so that the interior diameter and exterior diameter of the shells are in standard, graduated sizes that will match standard sized bores and shafts. As will be apparent, the bevelled surfaces 4 and 5 of any shell 3 permit the centering tool to match any bore or shaft which may have a diameter lying between the exterior and interior dimension of such shell. Thus, a centering tool having a punch with a diameter of, say, 1/8" and an outermost shell of, say, 1" diameter would be able to center any shaft or any bore having a diameter between those extremities.

In centering a shaft 10 having a diameter of standard size, Fig. 1, the centering tool is placed over the end of the shaft and thereby one of the shells 3 of complementary diameter to the shaft automatically slides over and snugly fits the shaft. The perimetrical edges 8 of the shells 3 which are of smaller diameter than the diameter of the shaft engage the end 11 of such shaft. Thus, the punch 2 is automatically located at the center of the shaft 10 and is held at right angles thereto by the perimetrical edges 8 of the shells 3. The center punch is then tapped and an impression is made in the exact center of the shaft. It is to be noted that either end of the centering tool may be slipped over the end of a standard sized shaft.

In centering a shaft 12 which is odd sized or at least not complementary to the interior diameter of any of the shells 3 the centering tool should be reversed from that shown in Fig. 1 so that one of the bevelled surfaces 5 engage the periphery of the shaft, as illustrated in Fig. 2. The perimetrical edges 9 of the smaller diameter shells engage the end 13 of the shaft 12 and in doing so the centering tool is automatically erected at right angles to the end of the shaft inasmuch as the perimetrical edges are made at right angles to the longitudinal axis of the centering tool. The bevelled surface 5 engaging the periphery of the shaft locates the point of the punch on the axis of the shaft and the punch is thus ready for tapping. As shown in Fig. 3 each of the shells are of a different length, as well as of a different diameter, and the ends thereof thus form either a stepped surface (Fig. 1) or a conical surface (Fig. 2) and thereby permit the easy grasping thereof by the user and the application of pressure on the shells in order to keep them in alignment while the punch 2 is being struck.

The translation of the center of a bore 14 from a templet 15 to a work piece 16 is illustrated in Fig. 4. The diameter of the illustrated bore 14 not being of a standard size, the centering tool is reversed from that shown in Fig. 2 are so that the perimetrical edges 8 of the centering tool engage the templet 15 and work piece 16. One of the bevelled surfaces 4 engages the top of the templet 14 at the edge of the bore and thus centers the punch in the bore. The perimetrical edges 8 of the shell 3 which are of smaller diameter than the bore engage the top surface of the work piece and thus erects the centering tool perpendicular to the surface of the work piece. The perimetrical edges 8 of the shells having interior diameters greater than the diameter of the bore 14 engage the surface of the templet and thus tends to keep the centering tool perpendicular to the surface of the templet.

In the event that the surfaces of the templet are rough or irregular the perimetrical edges 8 which would otherwise engage the surface of the templet are either removed or kept from engagement therewith, in order that the centering tool be located at right angles to the surface of the work piece and thus insure the accuracy of the centering tool.

In translating the center of a bore having a diameter complementary to the exterior diameter of one of the shells of the centering tool, either end of the centering tool may be placed in the bore and against the work piece and templet. The matching shell would, of course, engage the radial surface of the bore throughout the depth of the templet and thereby center the punch in the bore. Because of the sectionalization of my centering tool the thickness of the templet makes little difference in the translation of the center of the bore therein. That is to say, a templet having a substantial depth is not required inasmuch as the centering tool can be accurately located in any templet having a depth equivalent to or greater than the depth of any bevelled surface 4 or 5.

It is to be understood that my centering tool is reversible by merely withdrawing and reversing the center punch. Each piece of the tool is accurately ground to close tolerances and the reversal of the center punch will, therefore, not affect the accuracy of the tool. Knurls 17 and 18 have been placed on the outer shell and on the upper end of the center rod punch, respectively, for easier handling but are not, of course, necessary to my invention.

My centering tool can also be readily used to determine the center of a hole to be drilled in the corner of a work piece. As illustrated in Fig. 5, a shell 19 having the necessary diameter has its outer surface aligned with the edges 20 and 21 of the work piece 22. The center punch 2 is thereby located over the center of the hole to be drilled.

My centering tool also solves the problem of transferring a hole which is near a wall or other vertical elevation. As heretofore explained the centering tool relies upon the accuracy of the surface of the work piece in erecting the centering tool at right angles to the work piece and the shells larger than the bore whose center is to be drilled can, therefore, be removed from the centering tool without loss of accuracy. It is, therefore, possible to center a bore which is only the thickness of a single shell away from a vertical wall and in the case of a bore having a diameter complementary to one of the shells the rim of the bore can be in actual contact with the vertical wall and still be centered with the use of my centering tool.

Having described my invention, I claim:

1. A centering tool comprising a center punch and a plurality of telescoping cylindrical shells encompassing said punch, each of said shells having a bevelled surface at each end thereof parallel to the bevelled surface at the opposite end.

2. A centering tool comprising a center punch and a plurality of telescoping cylindrical shells encompassing said punch, each of said shells having parallel bevelled surfaces at each end thereof and having continuous, parallel perimetrical edges at each end thereof at right angles to the longitudinal axis of said centering tool.

3. A centering tool comprising a plurality of graduated, telescoping, cylindrical shells and a center punch located at the center of said shells and in sliding contact with the innermost shell, said center punch and shells having a common longitudinal axis and having continuous, parallel bevelled end surfaces at both ends thereof which form a closed cone when the said surfaces are placed in matching engagement with each other.

4. A centering tool comprising a plurality of graduated, telescoping, cylindrical shells, a center rod punch having a tapered end, said punch being in contact with the innermost shell and slideable axially within said shells along their longitudinal axis, each of said shells having continuous bevelled surfaces at both ends thereof angled toward the longitudinal axis of said shells, one end of said shells forming with said tapered end of said punch a cone when placed in matching engagement with one another.

References Cited in the file of this patent

UNITED STATES PATENTS

| | | |
|---|---|---|
| 468,857 | Williams et al. | Feb. 16, 1892 |
| 1,160,752 | Pfleiderer et al. | Nov. 16, 1915 |
| 1,233,458 | Fisk | July 17, 1917 |
| 1,295,785 | Monacelli | Feb. 25, 1919 |
| 1,420,847 | Konigsberg | June 27, 1922 |
| 1,688,819 | Leck | Oct. 23, 1928 |
| 2,086,435 | Rapp | July 6, 1937 |
| 2,365,461 | Fairbanks | Dec. 19, 1944 |
| 2,465,227 | Heatley | Mar. 22, 1949 |
| 2,526,528 | Zickler et al. | Oct. 17, 1950 |
| 2,595,347 | Flemming | May 6, 1952 |
| 2,675,625 | Rayl | Apr. 20, 1954 |

FOREIGN PATENTS

| | | |
|---|---|---|
| 18,447 | Great Britain | 1910 |